(12) United States Patent
Ammer

(10) Patent No.: US 7,926,604 B2
(45) Date of Patent: Apr. 19, 2011

(54) ELECTRICAL HARNESS CLIPPING BAR FOR AFTERTREATMENT DEVICE

(75) Inventor: John M. Ammer, New Haven, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 716 days.

(21) Appl. No.: 11/956,513

(22) Filed: Dec. 14, 2007

(65) Prior Publication Data

US 2008/0142657 A1   Jun. 19, 2008

Related U.S. Application Data

(60) Provisional application No. 60/870,749, filed on Dec. 19, 2006.

(51) Int. Cl.
*B60K 13/04* (2006.01)

(52) U.S. Cl. ............................. 180/89.2; 180/309

(58) Field of Classification Search ................ 180/89.2, 180/309; 248/219.1, 207; 60/274, 297, 299; 29/592
See application file for complete search history.

(56) References Cited

U.S. PATENT DOCUMENTS

| | | | | |
|---|---|---|---|---|
| 3,237,716 A * | 3/1966 | Parsons | | 181/243 |
| 4,315,243 A * | 2/1982 | Calvert, Sr. | | 340/449 |
| 4,338,784 A * | 7/1982 | Liu et al. | | 60/274 |
| 4,343,374 A * | 8/1982 | Hollandsworth | | 180/69.22 |
| 4,719,752 A * | 1/1988 | Hall | | 60/322 |
| 4,907,666 A * | 3/1990 | Tecco | | 180/89.2 |
| 5,127,489 A * | 7/1992 | Takato et al. | | 180/309 |
| 5,197,698 A * | 3/1993 | Bartholomew | | 248/60 |
| 5,570,861 A * | 11/1996 | Olsen et al. | | 248/74.1 |
| 5,649,685 A * | 7/1997 | Keller | | 248/638 |
| 5,873,429 A * | 2/1999 | Qutub | | 180/309 |
| 5,988,308 A * | 11/1999 | Qutub | | 180/309 |
| 6,095,460 A * | 8/2000 | Mercer et al. | | 248/59 |
| 6,105,708 A * | 8/2000 | Amano et al. | | 180/309 |
| 6,415,602 B1 * | 7/2002 | Patchett et al. | | 60/286 |
| 6,536,548 B2 * | 3/2003 | Steenackers et al. | | 180/89.2 |
| 6,581,374 B2 * | 6/2003 | Patchett et al. | | 60/286 |
| 6,584,768 B1 * | 7/2003 | Hecker et al. | | 60/297 |
| 6,632,406 B1 * | 10/2003 | Michelin et al. | | 422/178 |
| 6,662,553 B2 * | 12/2003 | Patchett et al. | | 60/286 |
| 6,742,330 B2 * | 6/2004 | Genderen | | 60/286 |
| 6,981,567 B2 * | 1/2006 | Stodolka | | 180/309 |
| 7,017,335 B2 * | 3/2006 | Huber et al. | | 60/286 |
| 7,150,145 B2 * | 12/2006 | Patchett et al. | | 60/286 |
| 7,478,700 B2 * | 1/2009 | Connelly | | 180/296 |
| 7,501,005 B2 * | 3/2009 | Thaler | | 55/523 |
| 7,517,380 B2 * | 4/2009 | Grimm et al. | | 55/523 |
| 7,677,031 B2 * | 3/2010 | Knitt | | 60/295 |
| 7,678,168 B2 * | 3/2010 | Connelly et al. | | 55/385.3 |

(Continued)

*Primary Examiner* — J. Allen Shriver, II
*Assistant Examiner* — Jacob Meyer
(74) *Attorney, Agent, or Firm* — Jeffrey P. Calfa; Mark C. Bach

(57) ABSTRACT

A clipping bar device is provided for use with a vehicle exhaust aftertreatment device in order to securely guide, secure, and protect wires, tubes, cables, or conduits which may pass in close proximity with the vehicle exhaust aftertreatment device. The clipping bar device may share mounting points with a heat shield, and is provided with a series of holes, so as to be compatible with multiple feature configurations. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

9 Claims, 21 Drawing Sheets

Exhaust Aftertreatment Device with Clipping Bar Device

U.S. PATENT DOCUMENTS

| | | | |
|---|---|---|---|
| 2001/0047897 A1* | 12/2001 | Steenackers et al. | 180/89.2 |
| 2004/0060763 A1* | 4/2004 | Stodolka | 180/309 |
| 2007/0169981 A1* | 7/2007 | Connelly | 180/309 |
| 2008/0053737 A1* | 3/2008 | Cerri | 180/309 |
| 2008/0120961 A1* | 5/2008 | Meier et al. | 60/274 |
| 2008/0173007 A1* | 7/2008 | Imes | 60/274 |
| 2008/0314033 A1* | 12/2008 | Aneja et al. | 60/297 |
| 2009/0113709 A1* | 5/2009 | Mueller et al. | 29/890 |
| 2009/0293467 A1* | 12/2009 | Boeckenhoff | 60/324 |

\* cited by examiner

Exhaust Aftertreatment Device
With Clipping Bar Device
and Heat Shield

Exhaust Aftertreatment Device
with Clipping Bar Device

Exhaust Aftertreatment Device with Clipping Bar Device

Clipping Bar Device
with Associated Clipping
and Routing

Clipping Bar Device with Associated Clipping and Routing

Clipping Bar Device
with Associated Clipping
and Routing

Clipping Bar Device with Associated Clipping and Routing

Clipping Bar Device
with Associated Clipping
and Routing

Clipping Bar Device
with Associated Clipping
and Routing

Clipping Bar Device
with Associated Clipping
and Routing

Clipping Bar Device with P-Clips and Wire Ties

Clipping Bar Device

Clipping Bar Device
with Various Types of Holes

Clipping Bar Device

Clipping Bar Device

Clipping Bar Device

Clipping Bar Device

ELECTRICAL HARNESS CLIPPING BAR FOR AFTERTREATMENT DEVICE

FIELD OF THE INVENTION

This invention relates to an vehicle exhaust aftertreatment device mounting assembly having a clipping bar device that serves to guide, secure, and protect wires, tubes, cables, or conduits. The clipping bar device may also serve to provide a mounting place for small devices associated with the vehicle exhaust aftertreatment device, such small devices including but not limited to valves, switches, or connectors. All, some, or none of the wires, tubes, cables, or conduits that are attached to the clipping bar device may actually lead to or from the exhaust aftertreatment device.

BACKGROUND

Vehicles for operation on the ground having internal combustion engines, particularly trucks and heavy vehicles, are increasingly provided with one or more exhaust aftertreatment devices. The exhaust aftertreatment device or devices may include catalytic converters, particulate filters, combustors, or mixing devices. These exhaust aftertreatment devices tend to produce a tremendous amount of heat by virtue of the hot exhaust gases passing through them, and sometimes by virtue of additional heat-producing reactions taking place within them. Often, the exhaust aftertreatment devices are equipped with sensors, which sensors are connected to the vehicle electrical system by wires. Other attachments may be present as well, such as fluid injectors, taps for sampling the exhaust flow, or electrodes for operating internal electrical devices. The attachments, whatever their function, are generally connected to the vehicle systems by some type of wire, tube, cable, or conduit.

Because of the high temperatures generated by the exhaust aftertreatment device, any wire, tube, cable, or conduit leading to a sensor or attachment must be carefully and securely located to prevent it from coming into contact with, or even too close to, the exhaust aftertreatment device. Furthermore, due to the variability associated with vehicle manufacturing which stems from the multiplicity of vehicle, engine, and exhaust configurations, it is advantageous to maximize the adaptability of any device that is used to so locate and secure the wires, tubes, cables, or conduits. It is also advantageous that any such device be compatible with conventional, "off-the-shelf" fasteners, P-clips, and wire-ties.

SUMMARY OF THE INVENTION

A vehicle for operation on the ground is provided having a frame, an internal combustion engine, and an exhaust system. The exhaust system incorporates an exhaust aftertreatment device, which exhaust aftertreatment device is attached to the vehicle frame by means of mounting brackets. The exhaust aftertreatment device may or may not be provided with one or more attachments such as sensors, switches, valves, injectors, taps, or electrodes. One or more lines, such as wires, tubes, cables, or conduits, possibly leading to the one or more attachments, pass in close proximity to the exhaust aftertreatment device. In order to prevent the one or more lines from contacting, or even coming too close to, the exhaust aftertreatment device, a clipping bar device is attached to the mounting brackets.

The clipping bar device is generally elongate and perforated with a series of holes, which holes are compatible with conventional "off-the-shelf" fasteners such as P-clips or wire-ties. It is oriented parallel to the exhaust aftertreatment device, and may extend beyond the ends of the body of the exhaust aftertreatment device. The conventional "off-the-shelf" fasteners are attached to the clipping bar device, using the series of holes, and are used to locate and secure the one or more lines. The series of holes may be simple round holes, or they may be square holes, keyhole shaped holes, or slots, in order to cooperate with anti-rotation features present upon the conventional "off-the-shelf" fasteners. For the sake of rigidity, the clipping bar device may be angular in cross-section. Alternately, it may have a C-channel cross-section, a "hat-section" cross-section, a Z-shaped cross-section, or even a tubular cross-section. The clipping bar device may incidentally provide support for other small devices related to the exhaust aftertreatment device, such as switches, connectors, couplings, valves, or remote sensors. The clipping bar device may share mounting points with a heat shield that protects the exhaust aftertreatment device.

The clipping bar device may be made of mild steel, galvanized steel, stainless steel, aluminum alloy, or other metal. Alternately, it may be made of heat-resistant polymer. It may be stamped, roll-formed, molded, or extruded, depending upon the material utilized.

As described above, the Electrical Harness Clipping Bar for Aftertreatment Device and a vehicle made with this device provide a number of advantages, some of which have been described above and others of which are inherent in the invention. Also, modifications may be proposed to the Electrical Harness Clipping Bar for Aftertreatment Device or a vehicle made with this device without departing from the teachings herein.

DETAILED DESCRIPTION OF THE INVENTION

Figure 1:
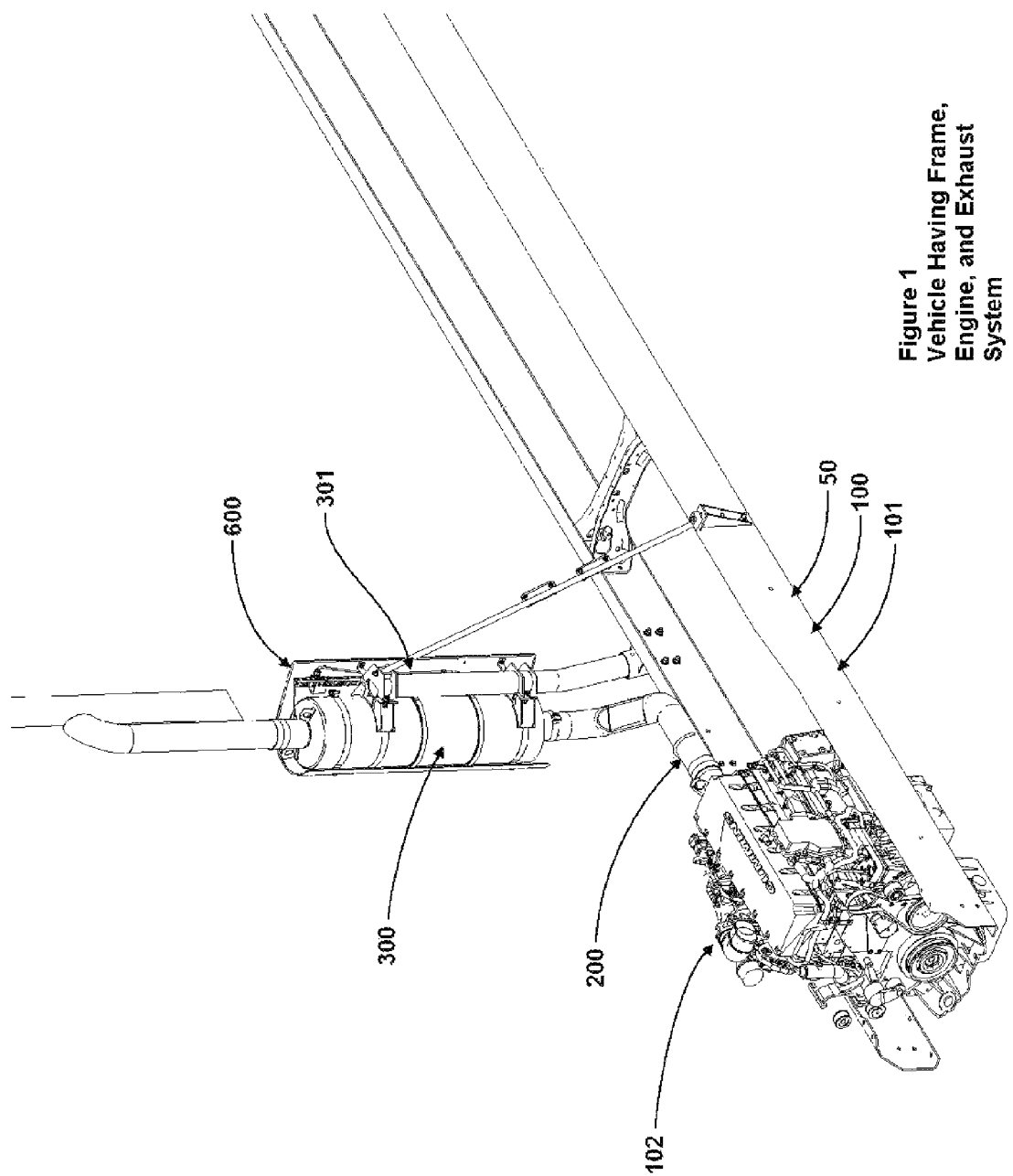
FIG. 1—A vehicle having a frame, engine, exhaust system, and exhaust aftertreatment device.

FIG. 1 shows a vehicle 50 having a ladder-type vehicle frame 100 having frame side-members 101. The vehicle 50 is provided with an engine 102 and an exhaust system 200 having an exhaust aftertreatment device 300. The exhaust aftertreatment device 300 is mounted vertically and supported by an exhaust aftertreatment device mounting assembly 301. The exhaust aftertreatment device 300 is further provided with a heat shield 600, which protects against inadvertent contact with the exhaust aftertreatment device 300, which may produce considerable heat.

Figure 2:
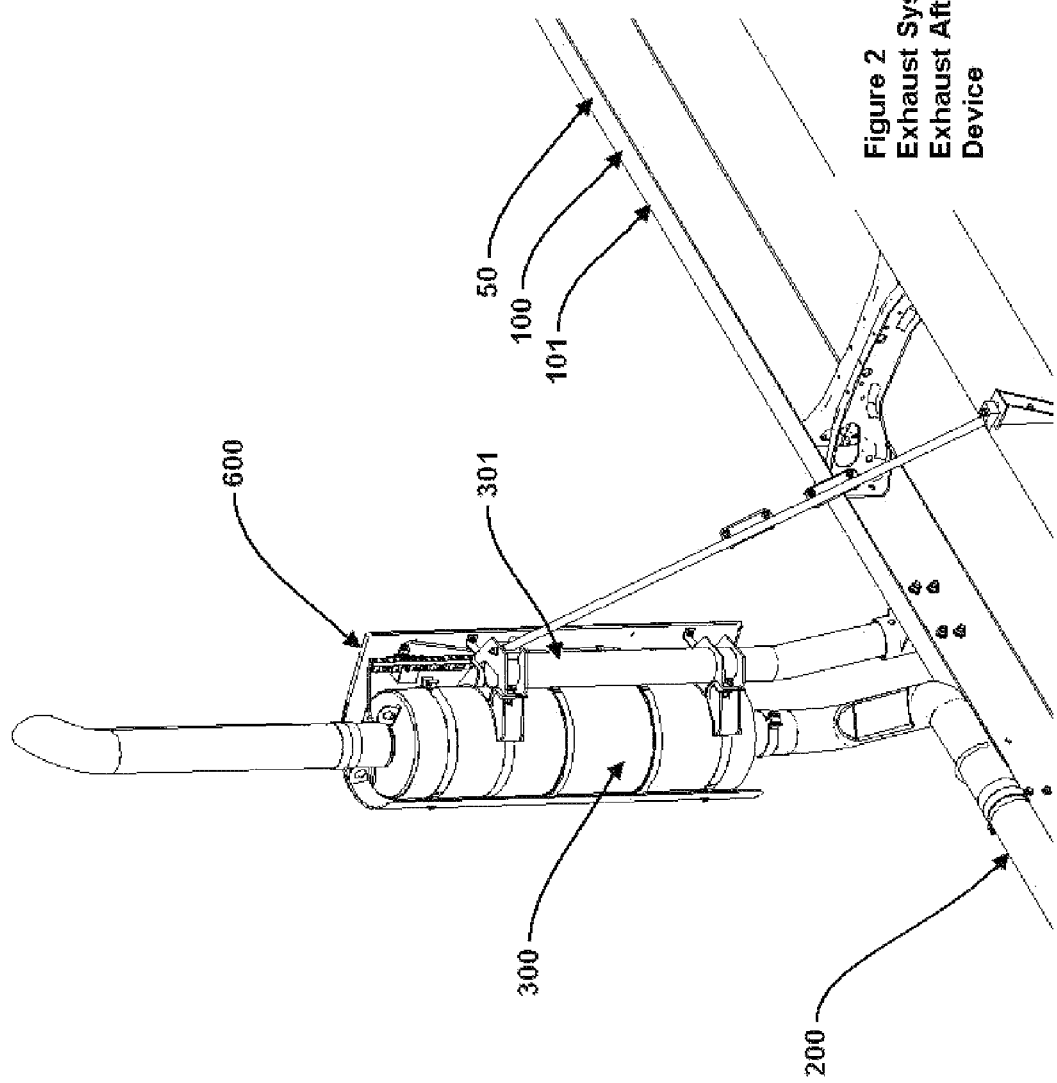
FIG. 2—An exhaust system and aftertreatment device.

FIG. 2 again shows a vehicle 50 having a ladder-type vehicle frame 100, frame side-members 101, an engine 102 (not shown), an exhaust system 200, and an exhaust aftertreatment device 300. The exhaust aftertreatment device 300 is again mounted vertically, supported by an exhaust aftertreatment device mounting assembly 301, and provided with a heat shield 600.

Figure 3:
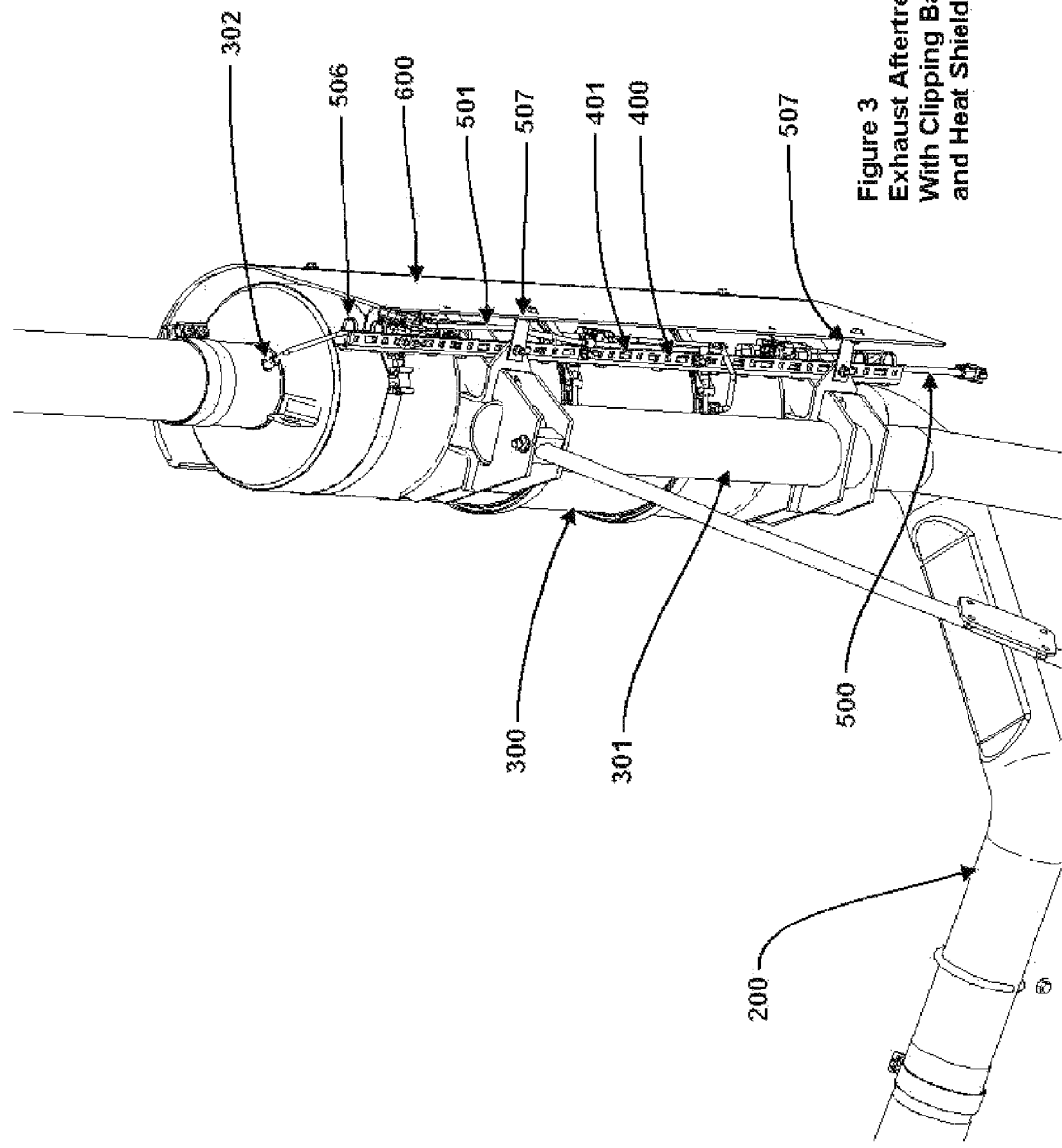
FIG. 3—An embodiment of the present invention, an exhaust aftertreatment device with a clipping bar device and a heat shield.

FIG. 3 shows an exhaust system 200 having an exhaust aftertreatment device 300 supported by an exhaust aftertreatment device mounting assembly 301. An embodiment of the present invention, a clipping bar device 400, is attached to the exhaust aftertreatment device mounting assembly 301, and is oriented parallel to the axis of the exhaust aftertreatment device 300. Various wires 500 and tubes 501 are attached to the clipping bar device 400 by means of wire-ties 506 inserted into holes 401 provided in the clipping bar device 400. In this way, the various wires 500 and tubes 501 are secured from contact with the exhaust aftertreatment device 300. The various wires 500 and tubes 501 may lead to or from sensors 302 attached to the exhaust aftertreatment device 300. A heat shield 600 is attached to the exhaust aftertreatment device mounting assembly 301 by means of heat shield standoffs 507. The heat shield standoffs 507 and the clipping bar device 400 may share common mounting points upon the exhaust aftertreatment device mounting assembly 301.

Figure 4:
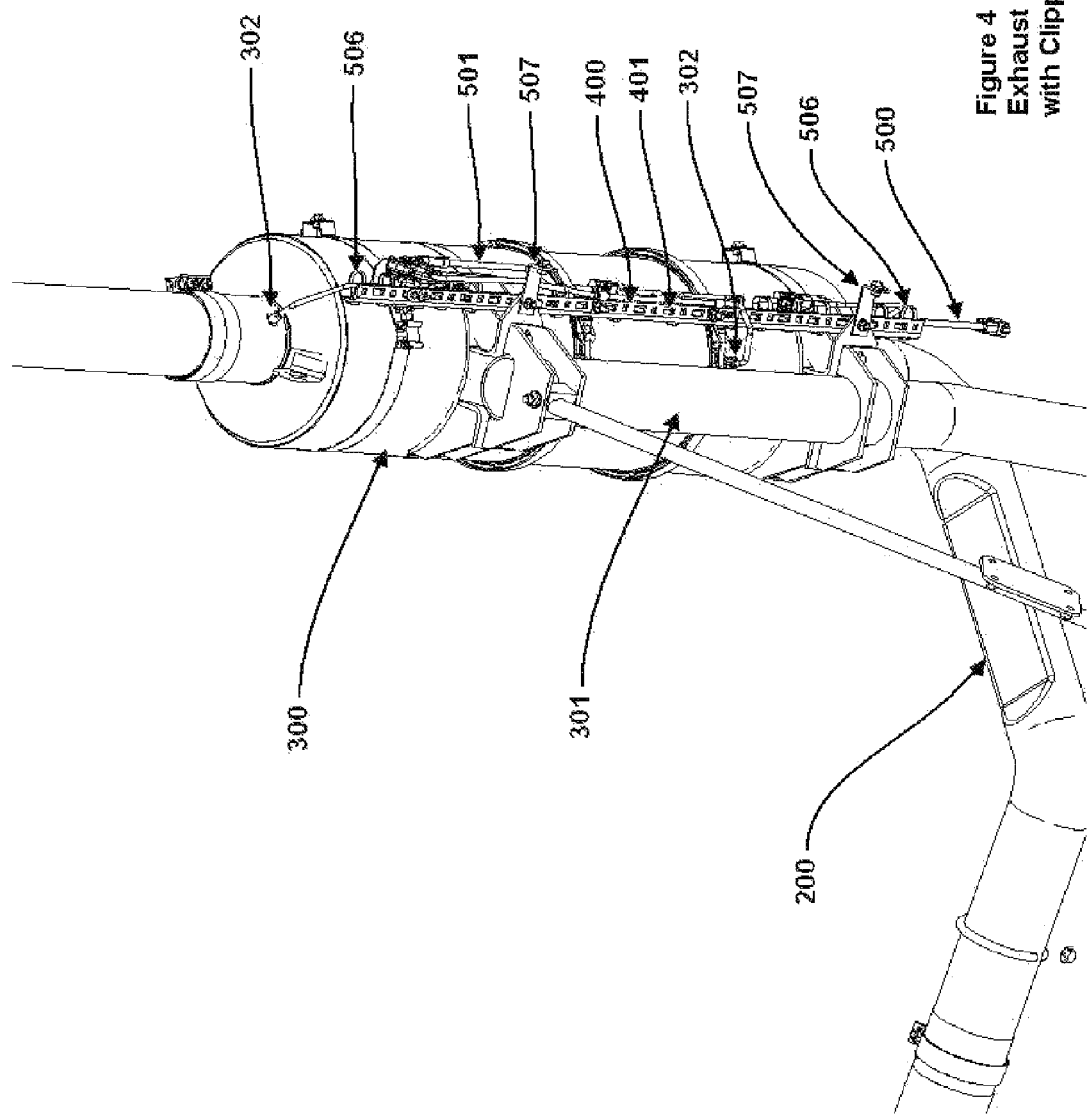
FIG. 4—An embodiment of the present invention, an exhaust aftertreatment device with a clipping bar device.

FIG. 4 again shows an exhaust system 200, an exhaust aftertreatment device 300, and an exhaust aftertreatment device mounting assembly 301. An embodiment of the present invention, a clipping bar device 400, is again attached to the exhaust aftertreatment device mounting assembly 301, oriented parallel to the axis of the exhaust aftertreatment device 300. Various wires 500 and tubes 501 are again attached to the clipping bar device 400 by means of wire-ties 506 inserted into holes 401 provided in the clipping bar device 400. The various wires 500 and tubes 501 may lead to or from sensors 302 attached to the exhaust aftertreatment device 300. Heat shield standoffs 507 are again provided for the attachment of a heat shield 600 (not shown). The heat shield standoffs 507 and the clipping bar device 400 may again share common mounting points upon the exhaust aftertreatment device mounting assembly 301.

Figure 5:
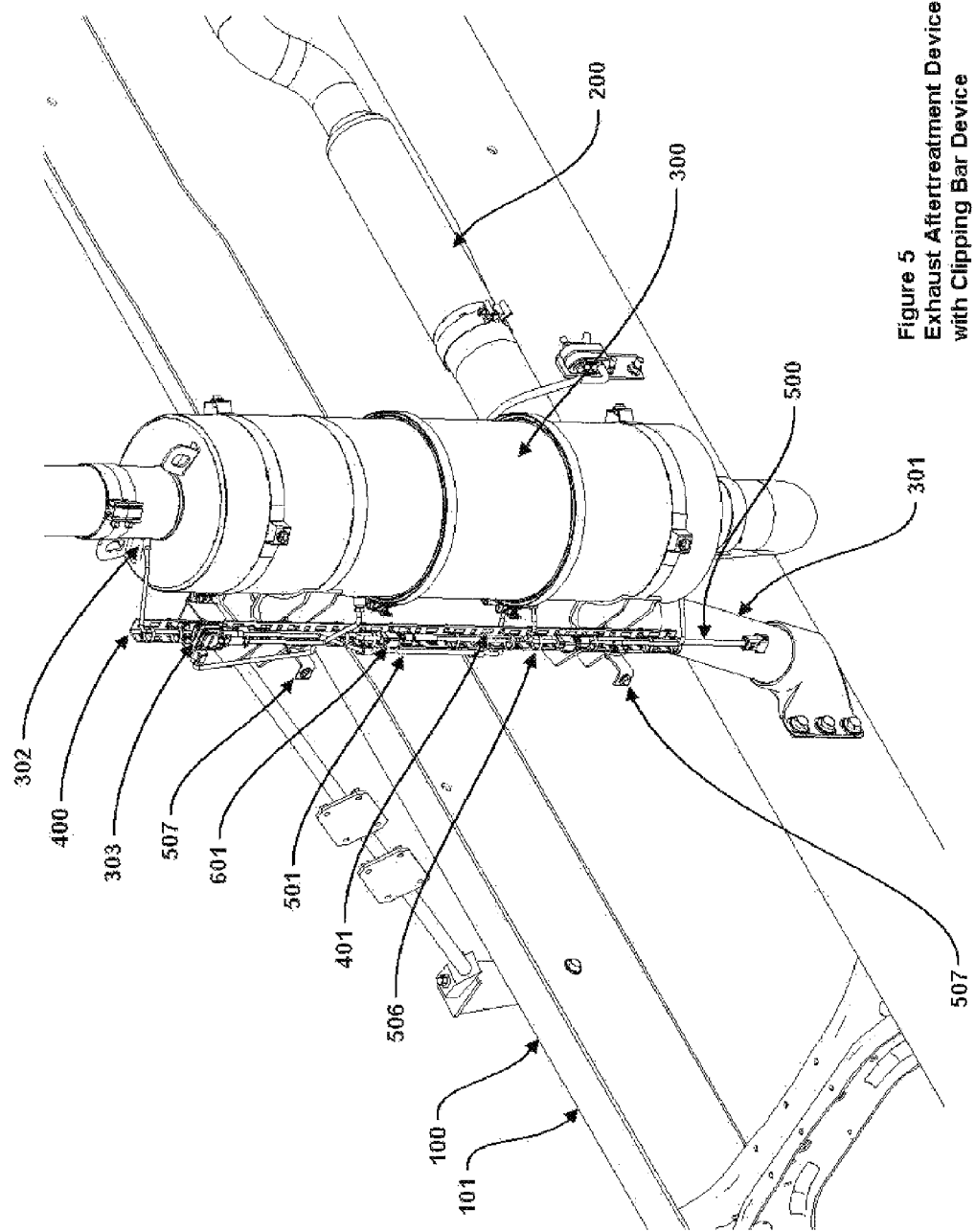
FIG. 5—An embodiment of the present invention, an exhaust aftertreatment device with a clipping bar device.

FIG. 5 again shows an exhaust system 200, an exhaust aftertreatment device 300, and an exhaust aftertreatment device mounting assembly 301 attached to a frame side-member 101 of a ladder-type vehicle frame 100. An embodiment of the present invention, a clipping bar device 400, is again attached to the exhaust aftertreatment device mounting assembly 301, oriented parallel to the axis of the exhaust aftertreatment device 300. Various wires 500, tubes 501, couplings 601, switches 303, and the like are attached to the clipping bar device 400 by means of wire-ties 506 inserted into holes 401 provided in the clipping bar device 400. The various wires 500 and tubes 501 may lead to or from sensors 302 attached to the exhaust aftertreatment device 300. Heat shield standoffs 507 are again provided for the attachment of a heat shield 600 (not shown).

Figure 6:
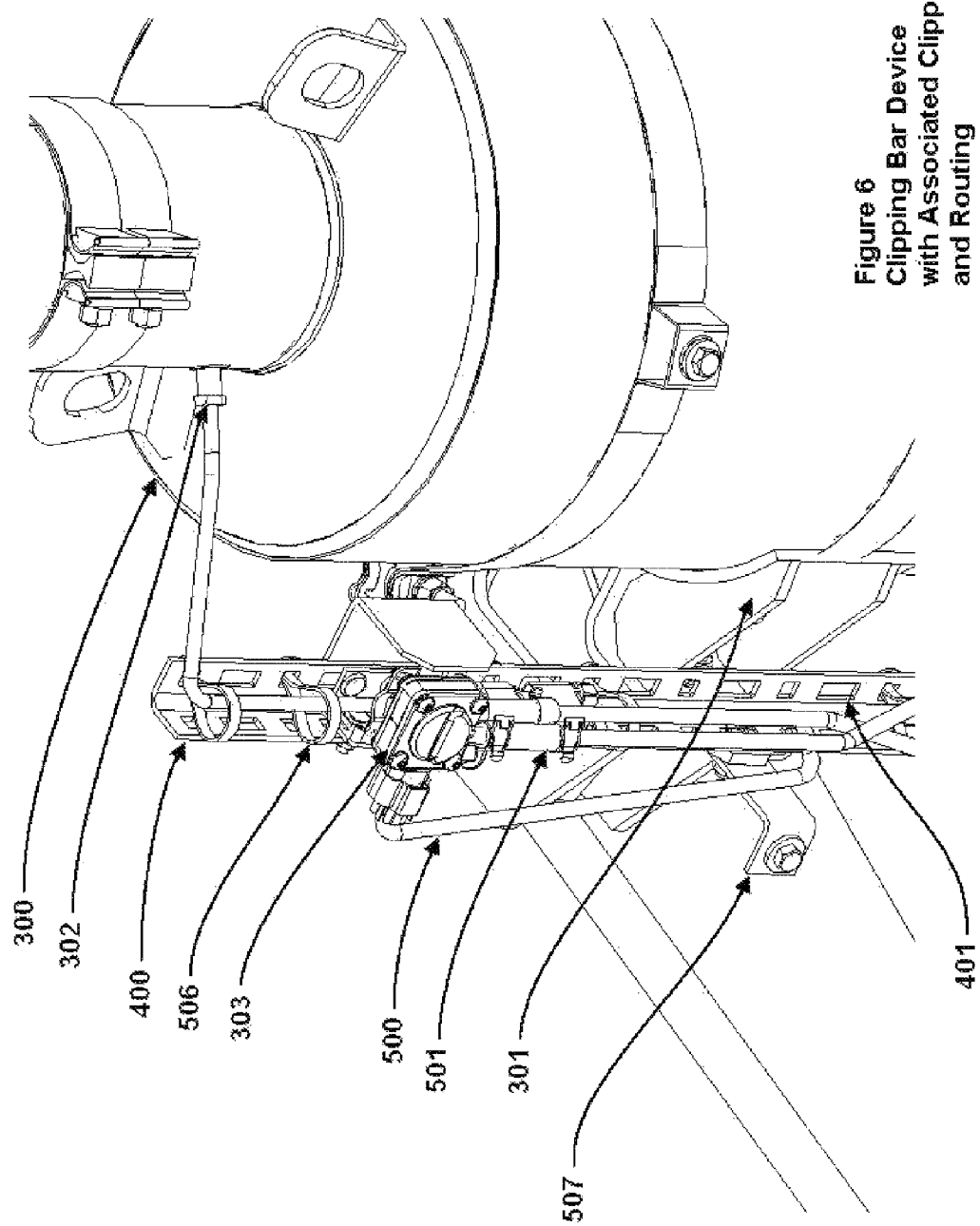
FIG. 6—An embodiment of the present invention, a clipping bar device showing routing and clipping.

FIG. 6 again shows an exhaust aftertreatment device 300, an exhaust aftertreatment device mounting assembly 301, and an embodiment of the present invention, a clipping bar device 400 attached to the exhaust aftertreatment device mounting assembly 301. Various wires 500, tubes 501, switches 303, and the like are again attached to the clipping bar device 400 by means of wire-ties 506 inserted into holes 401 provided in the clipping bar device 400. The various wires 500 and tubes 501 may lead to or from sensors 302 attached to the exhaust aftertreatment device 300. Heat shield standoffs 507 are again provided for the attachment of a heat shield 600 (not shown).

Figure 7:
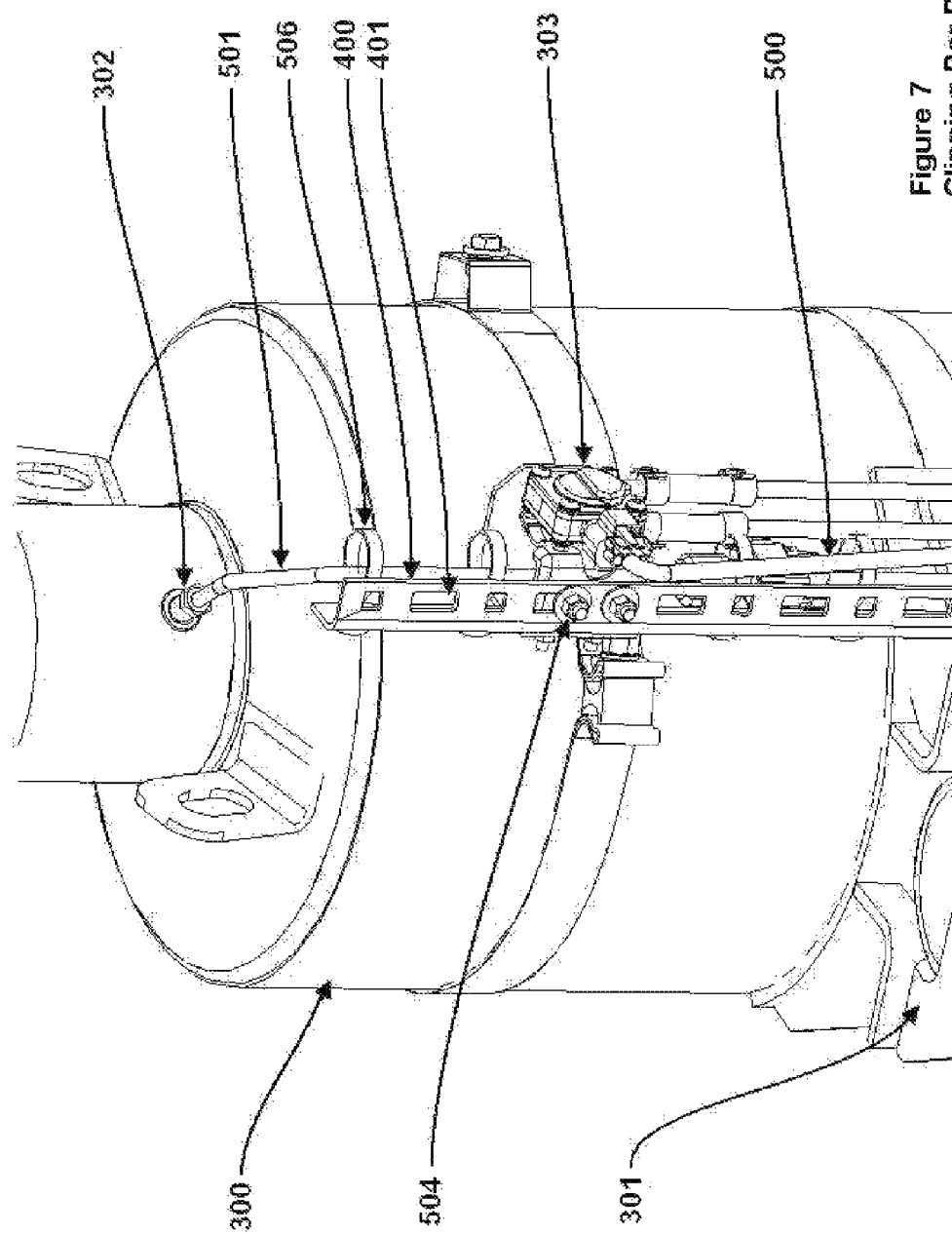
FIG. 7—An embodiment of the present invention, a clipping bar device showing routing and clipping.

FIG. 7 shows an exhaust aftertreatment device 300, an exhaust aftertreatment device mounting assembly 301, and an embodiment of the present invention, a clipping bar device 400 attached to the exhaust aftertreatment device mounting assembly 301. Various wires 500, tubes 501, switches 303, and the like are again attached to the clipping bar device 400 by means of wire-ties 506 inserted into holes 401 provided in the clipping bar device 400. The various wires 500 and tubes 501 may lead to or from sensors 302 attached to the exhaust aftertreatment device 300. Various fasteners 504 may also be used to mount devices to the clipping bar device 400 using the holes 401.

Figure 8:
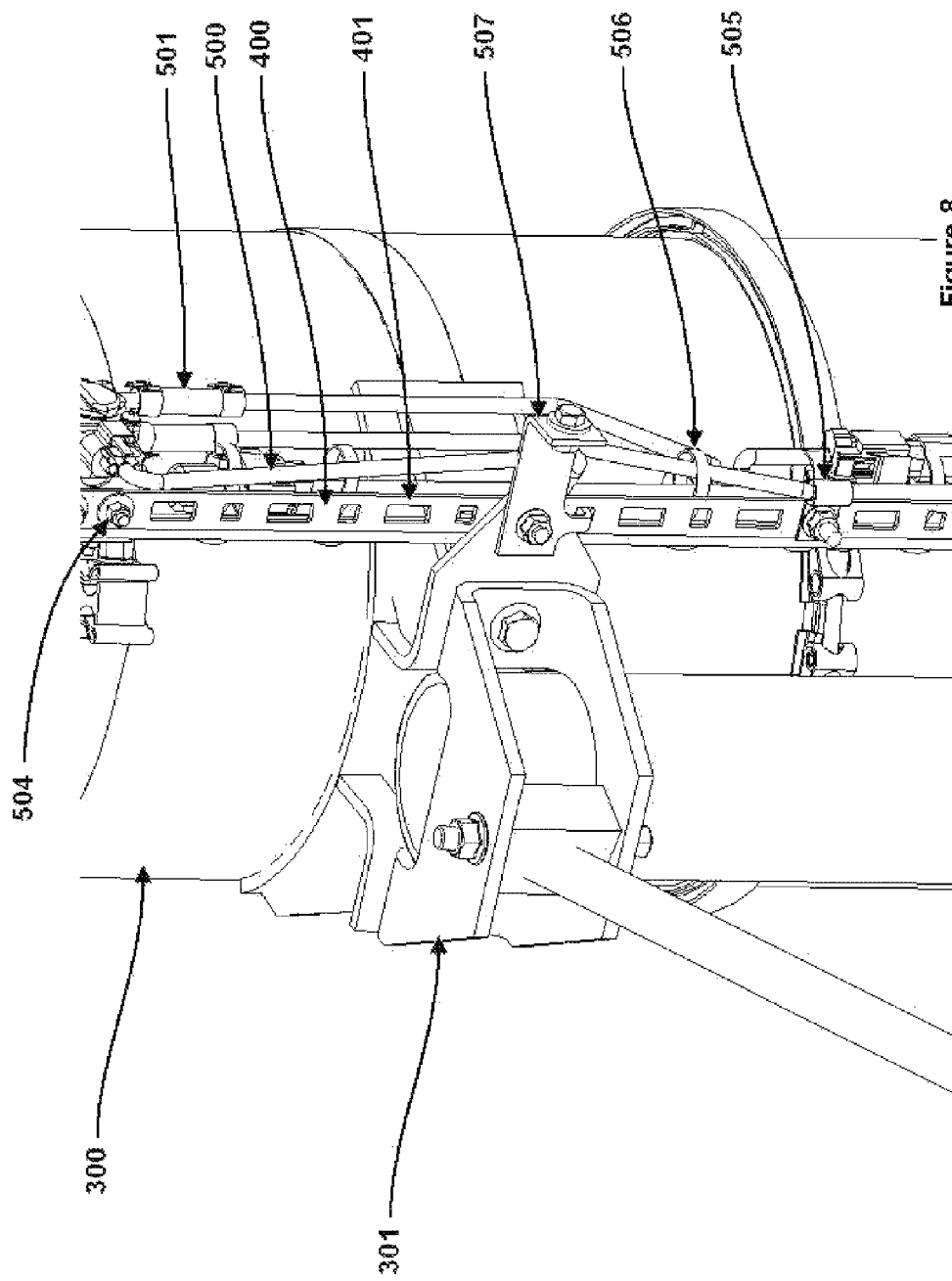
FIG. 8—An embodiment of the present invention, a clipping bar device showing routing and clipping.

FIG. 8 shows another view of an exhaust aftertreatment device 300, an exhaust aftertreatment device mounting assembly 301, and an embodiment of the present invention, a clipping bar device 400 attached to the exhaust aftertreatment device mounting assembly 301. Various wires 500 and tubes 501 are again attached to the clipping bar device 400 by means of wire-ties 506 inserted into holes 401 provided in the clipping bar device 400. Various fasteners 504 or P-clips 505 may also be used to mount lines or devices to the clipping bar device 400 using the holes 401. Heat shield standoffs 507 are again provided for the attachment of a heat shield 600 (not shown). The heat shield standoffs 507 and the clipping bar device 400 may again share common mounting points upon the exhaust aftertreatment device mounting assembly 301.

Figure 9:
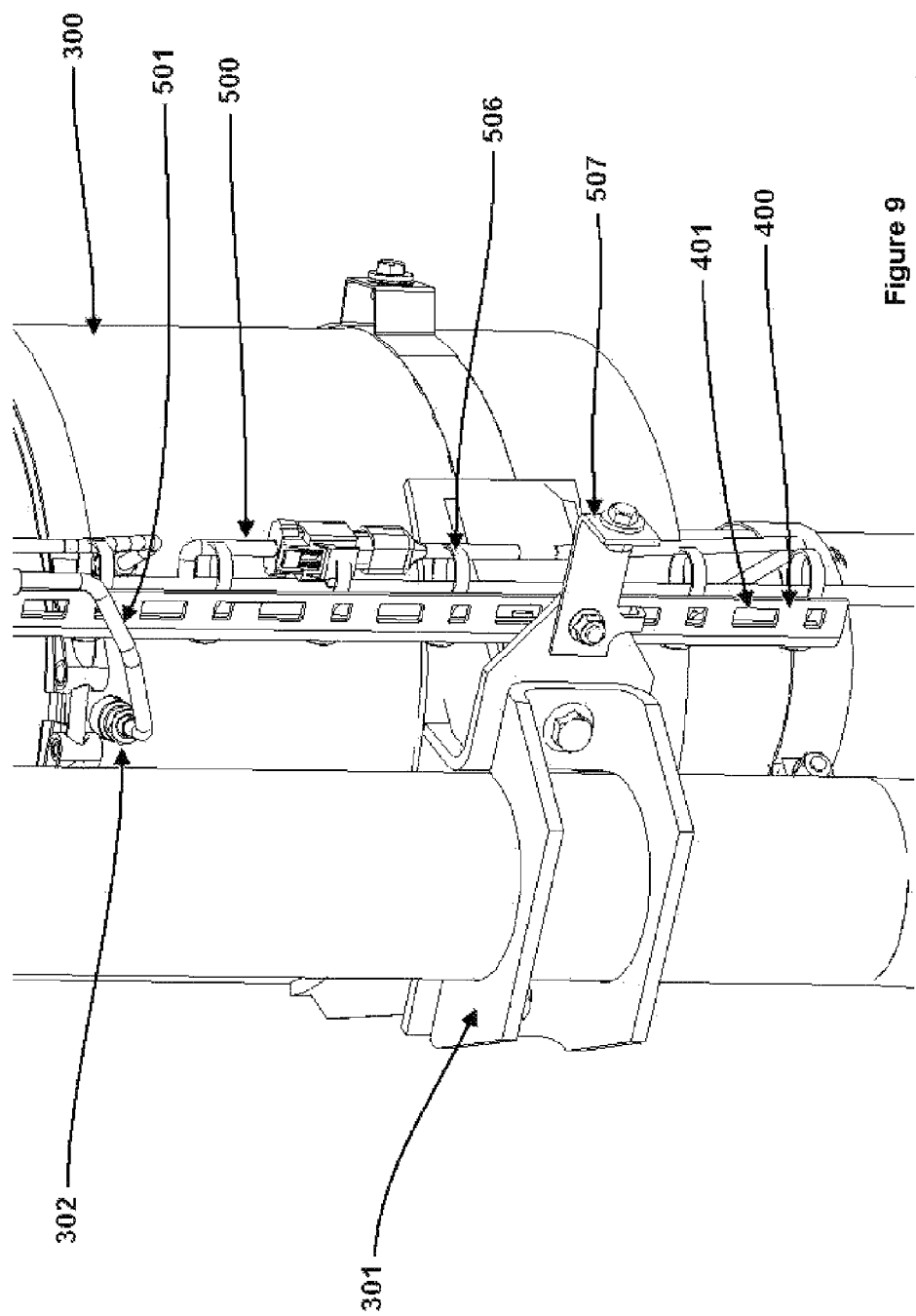
FIG. 9—An embodiment of the present invention, a clipping bar device showing routing and clipping.

FIG. 9 again shows an exhaust aftertreatment device 300, an exhaust aftertreatment device mounting assembly 301, and an embodiment of the present invention, a clipping bar device 400 attached to the exhaust aftertreatment device mounting assembly 301. Various wires 500 and tubes 501 are again attached to the clipping bar device 400 by means of wire-ties 506 inserted into holes 401 provided in the clipping bar device 400. The various wires 500 and tubes 501 may lead to or from sensors 302 attached to the exhaust aftertreatment device 300. Heat shield standoffs 507 are again provided for the attachment of a heat shield 600 (not shown).

Figure 10:
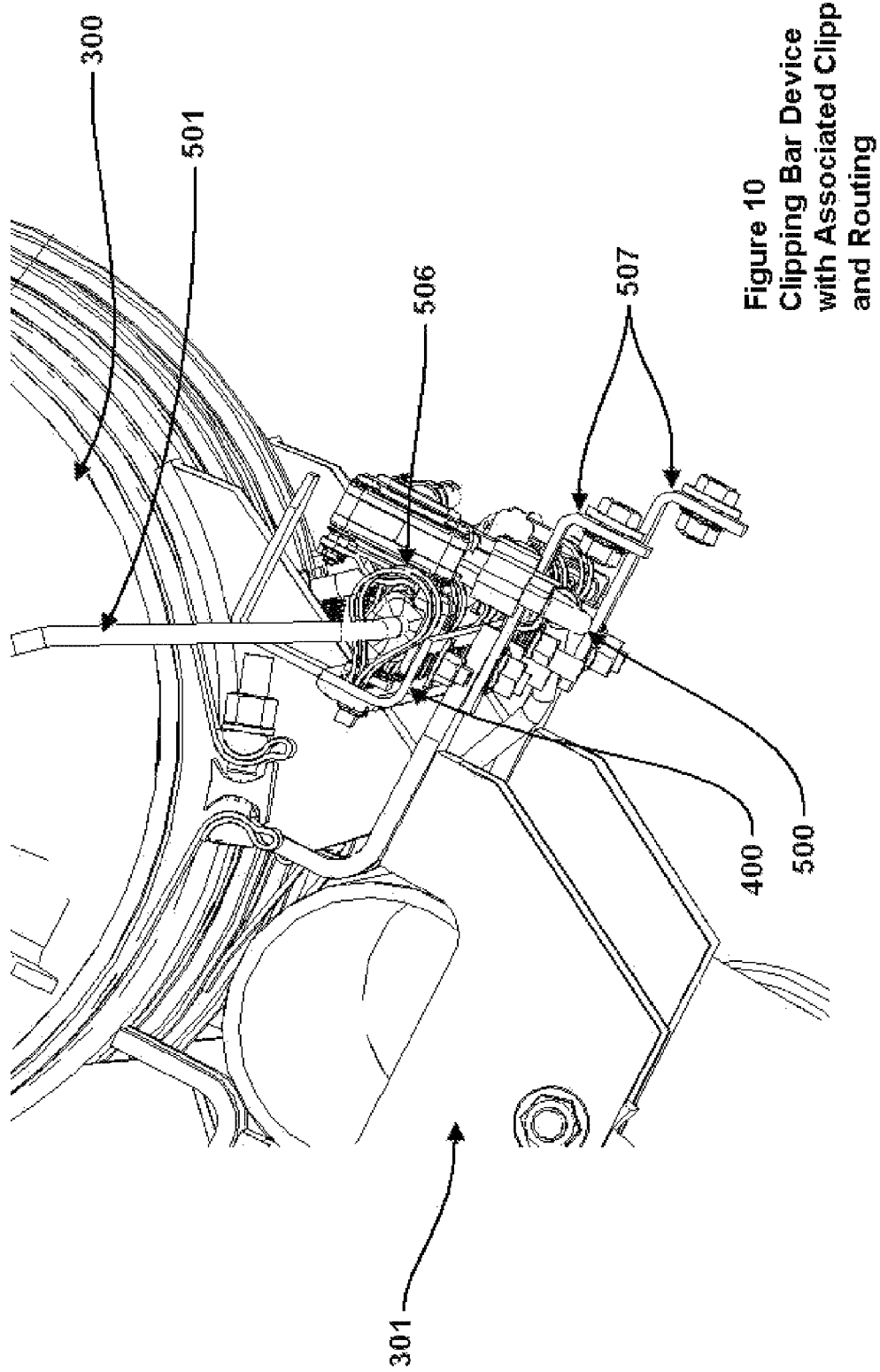
FIG. 10—An embodiment of the present invention, a clipping bar device showing routing and clipping.

FIG. 10 again shows an exhaust aftertreatment device 300, an exhaust aftertreatment device mounting assembly 301, and an embodiment of the present invention, a clipping bar device 400 attached to the exhaust aftertreatment device mounting assembly 301. Various wires 500 and tubes 501 are again attached to the clipping bar device 400 by means of wire-ties 506 inserted into holes 401 (not visible) provided in the clipping bar device 400. Heat shield standoffs 507 are again provided for the attachment of a heat shield 600 (not shown).

Figure 11:
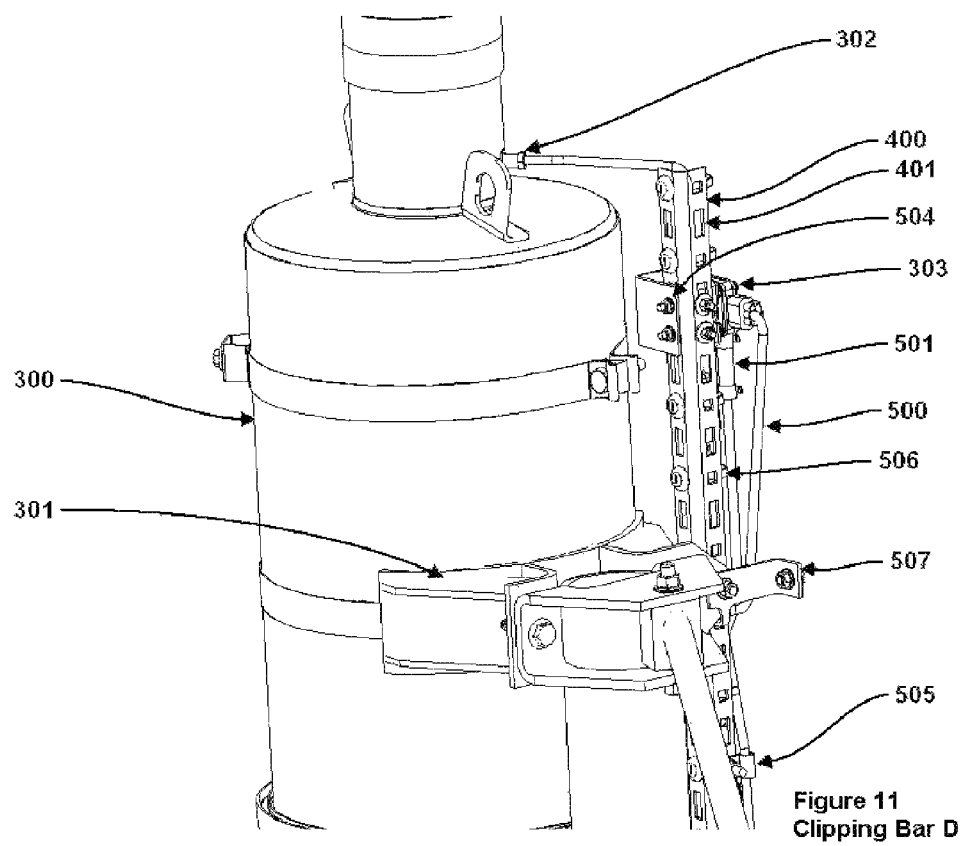
FIG. 11—An embodiment of the present invention, a clipping bar device showing routing and clipping.

FIG. 11 again shows an exhaust aftertreatment device 300, an exhaust aftertreatment device mounting assembly 301, and an embodiment of the present invention, a clipping bar device 400 attached to the exhaust aftertreatment device mounting assembly 301. Various wires 500, tubes 501, switches 303, and the like are again attached to the clipping bar device 400 by means of wire-ties 506 inserted into holes 401 (not visible) provided in the clipping bar device 400. Various fasteners 504 or P-clips 505 may also be used to mount lines or devices to the clipping bar device 400 using the holes 401. The various wires 500 and tubes 501 may lead to or from sensors 302 attached to the exhaust aftertreatment device 300. Heat shield standoffs 507 are again provided for the attachment of a heat shield 600 (not shown).

Figure 12:
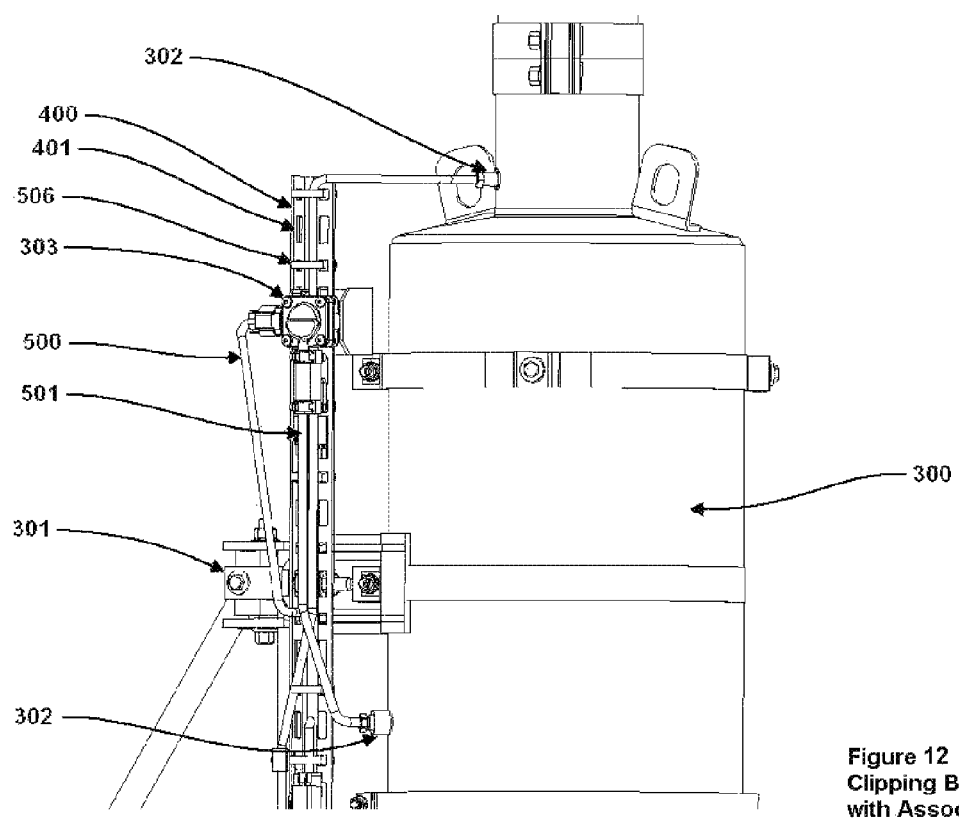
FIG. 12—An embodiment of the present invention, a clipping bar device showing routing and clipping.

FIG. 12 shows another view of an exhaust aftertreatment device 300, an exhaust aftertreatment device mounting assembly 301, and an embodiment of the present invention, a clipping bar device 400 attached to the exhaust aftertreatment device mounting assembly 301. Various wires 500, tubes 501, switches 303, and the like are again attached to the clipping bar device 400 by means of wire-ties 506 inserted into holes 401 provided in the clipping bar device 400. The various wires 500 and tubes 501 may lead to or from sensors 302 attached to the exhaust aftertreatment device 300.

Figure 13:
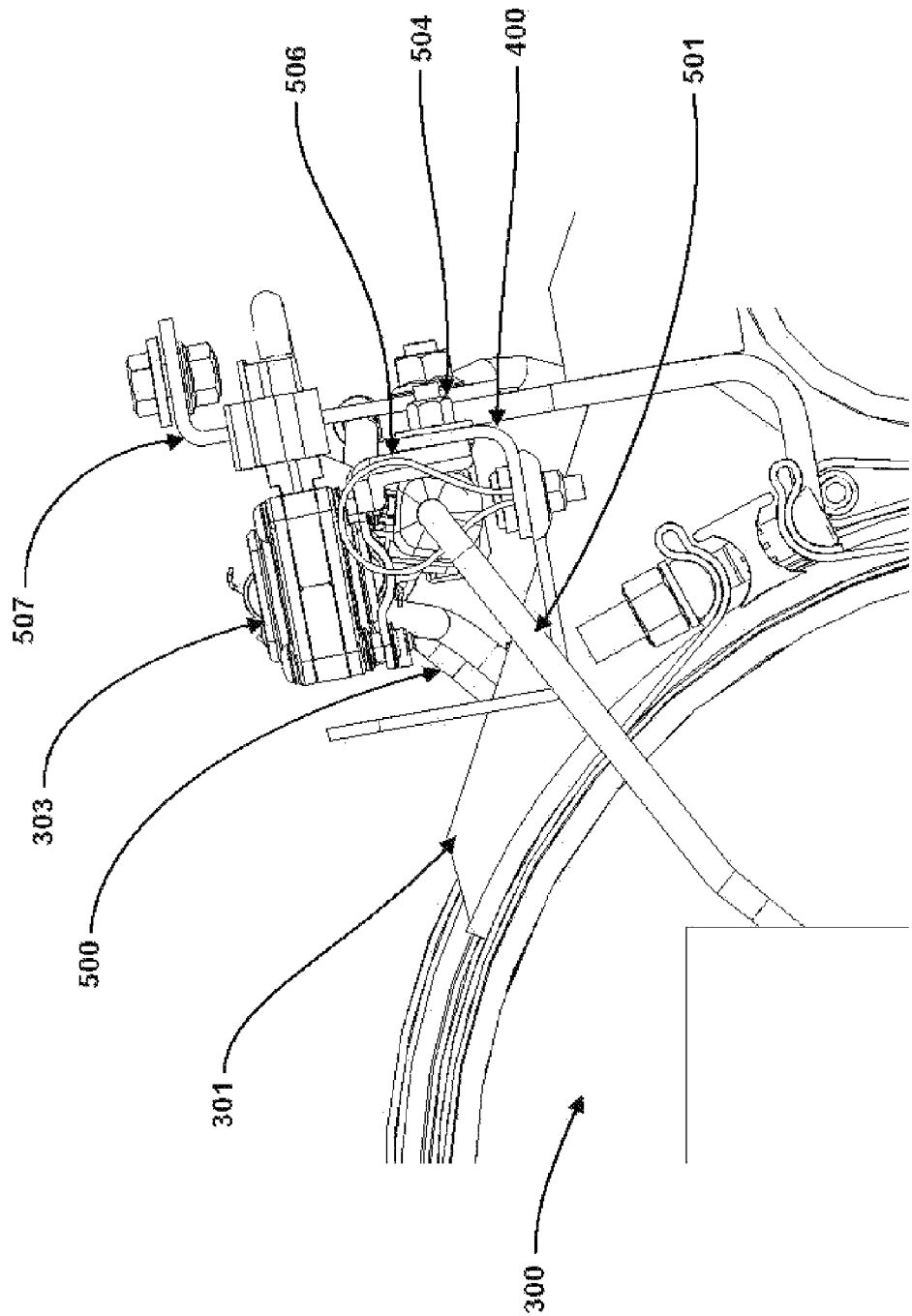
FIG. 13—An embodiment of the present invention, a clipping bar device showing routing and clipping.

FIG. 13 shows another view of an exhaust aftertreatment device 300, an exhaust aftertreatment device mounting assembly 301, and an embodiment of the present invention, a clipping bar device 400 attached to the exhaust aftertreatment device mounting assembly 301. Various wires 500, tubes 501, switches 303, and the like are again attached to the clipping bar device 400 by means of wire-ties 506 inserted into holes 401 (not visible) provided in the clipping bar device 400. Various fasteners 504 or P-clips 505 (not shown) may also be used to mount lines or devices to the clipping bar device 400 using the holes 401 (not visible). Heat shield standoffs 507 are again provided for the attachment of a heat shield 600 (not shown).

Figure 14:
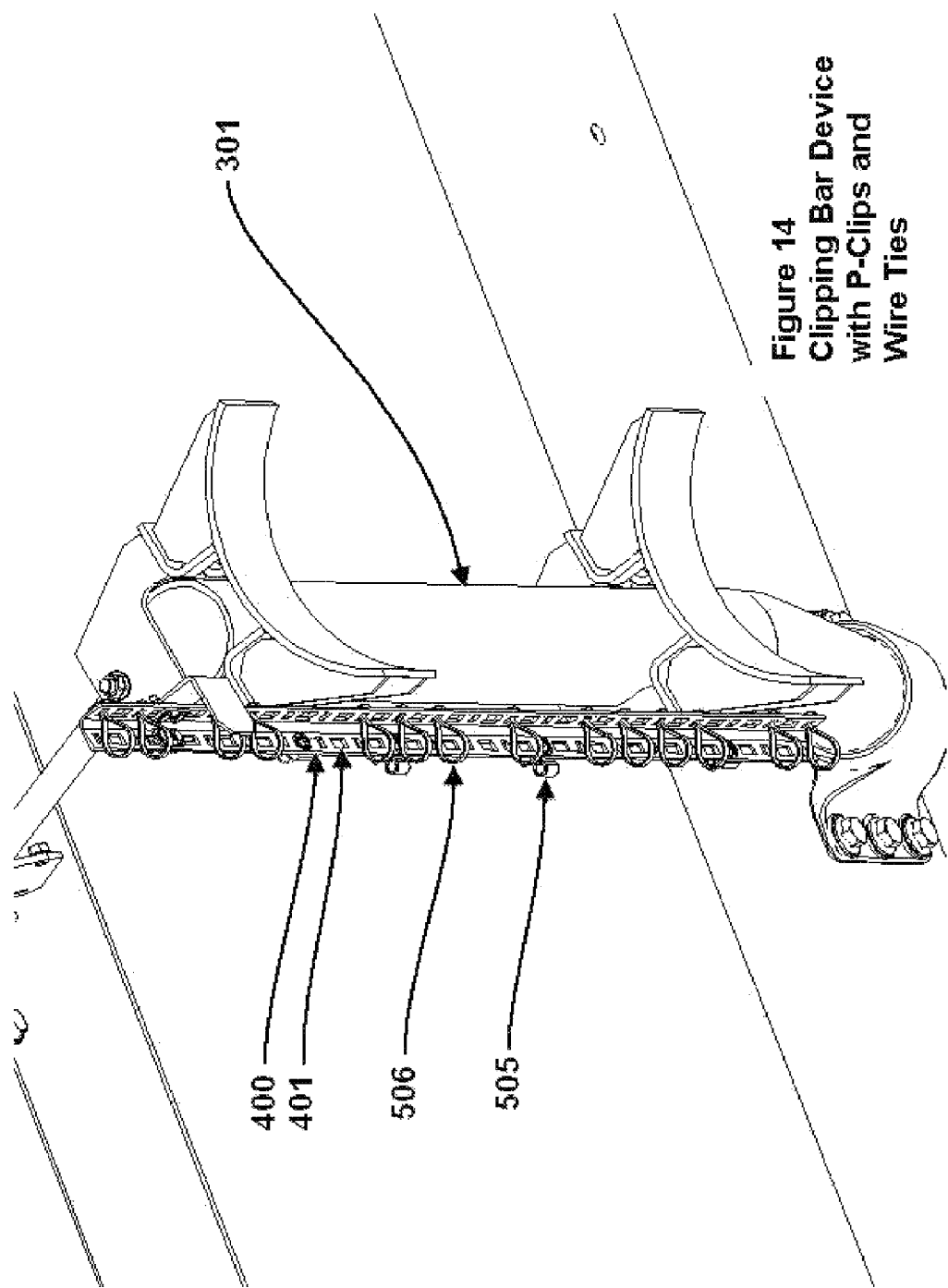
FIG. 14—An embodiment of the present invention, a clipping bar device with P-clips and wire-ties.

FIG. 14 shows a view of just the exhaust aftertreatment device mounting assembly 301 and an embodiment of the present invention, a clipping bar device 400 attached to the exhaust aftertreatment device mounting assembly 301. Wire-ties 506 and P-clips 505 are shown inserted into the holes 401 provided in the clipping bar device 400, showing their relative location and usage.

Figure 15:
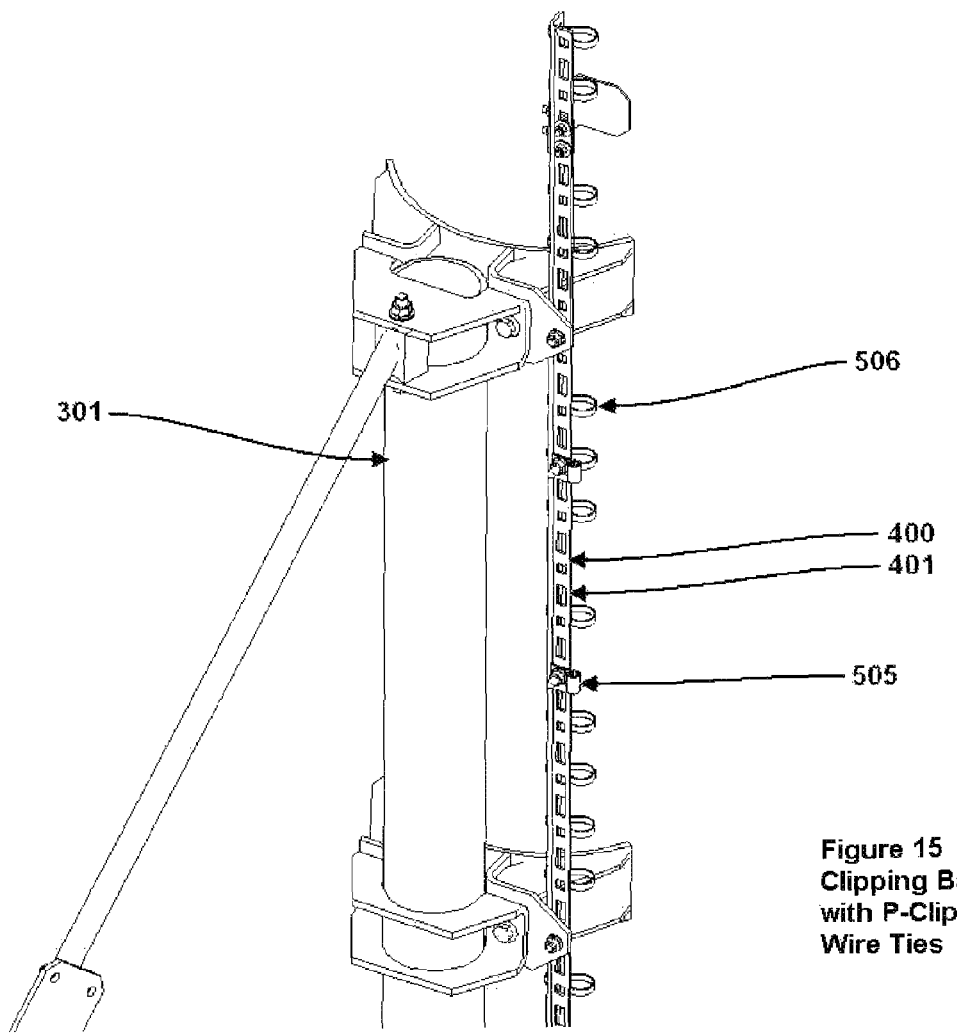
FIG. 15—An embodiment of the present invention, a clipping bar device with P-clips and wire-ties.

FIG. 15 shows another view of just the exhaust aftertreatment device mounting assembly 301 and an embodiment of the present invention, a clipping bar device 400 attached to the exhaust aftertreatment device mounting assembly 301. Wire-ties 506 and P-clips 505 are shown inserted into the holes 401 provided in the clipping bar device 400, showing their relative location and usage.

Figure 16:
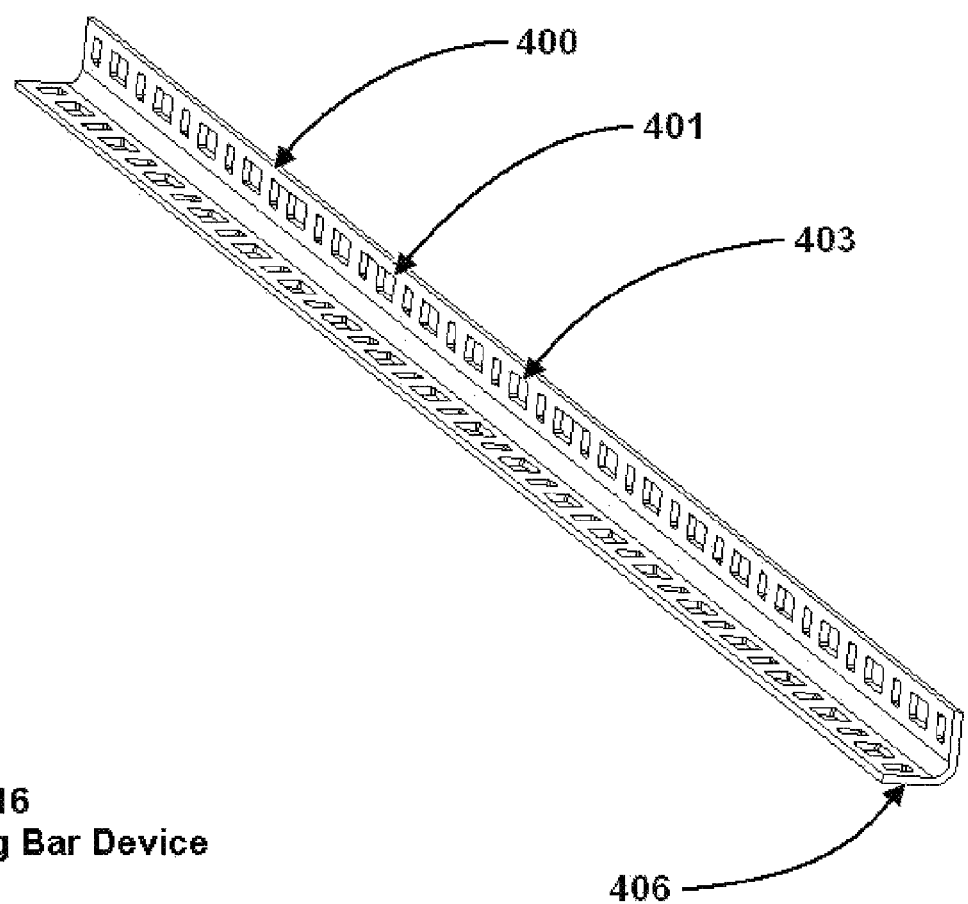
FIG. 16—An embodiment of the present invention, a clipping bar device.

FIG. 16 shows an embodiment of the present invention, a clipping bar device 400 having holes 401. The holes 401 in the clipping bar device 400 shown in FIG. 16 are square holes 403, and the clipping bar device 400 has an angular cross-section 406.

Figure 17:
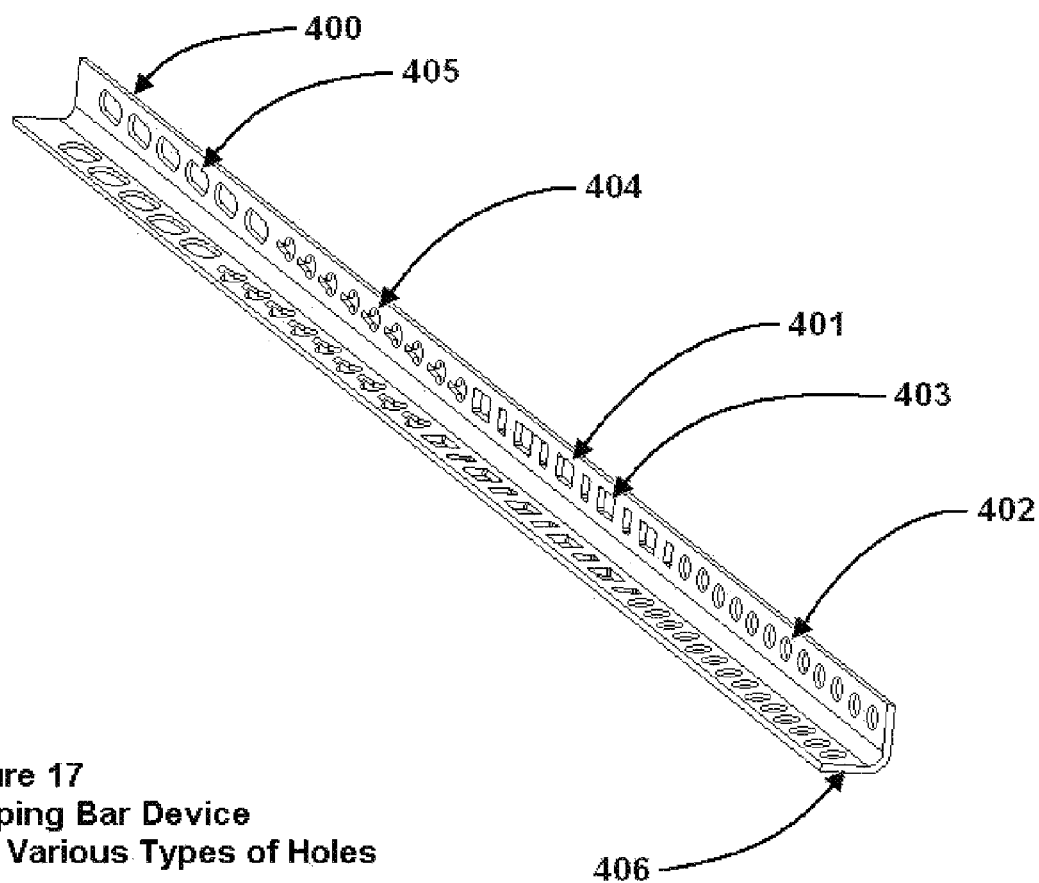
FIG. 17—An embodiment of the present invention, a clipping bar device.

FIG. 17 shows an embodiment of the present invention, a clipping bar device 400 having holes 401. Various types of holes 401 are shown in the clipping bar device 400, including round holes 402, square holes 403, keyholes 404, and slotted holes 405. The clipping bar device 400 has an angular cross-section 406.

Figure 18:
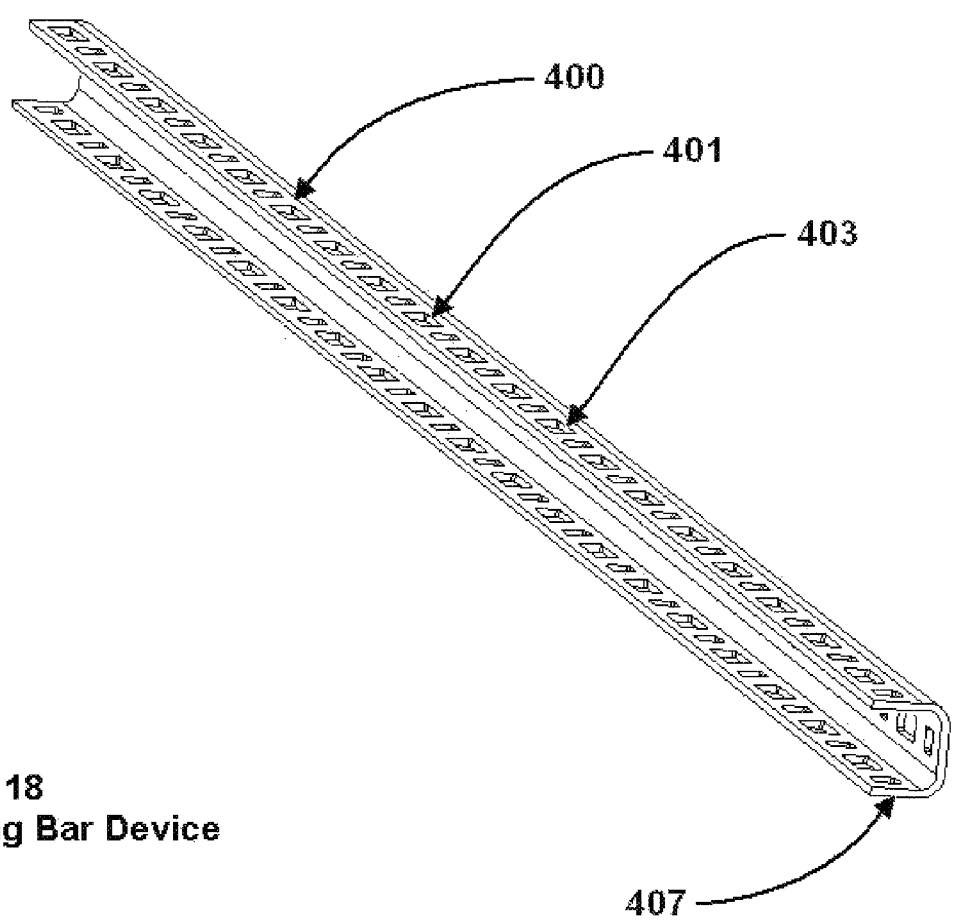
FIG. 18—An embodiment of the present invention, a clipping bar device.

FIG. 18 shows an embodiment of the present invention, a clipping bar device 400 having holes 401. The holes 401 in the clipping bar device 400 shown in FIG. 18 are square holes 403, and the clipping bar device 400 has a "C-channel" cross-section 407.

Figure 19:
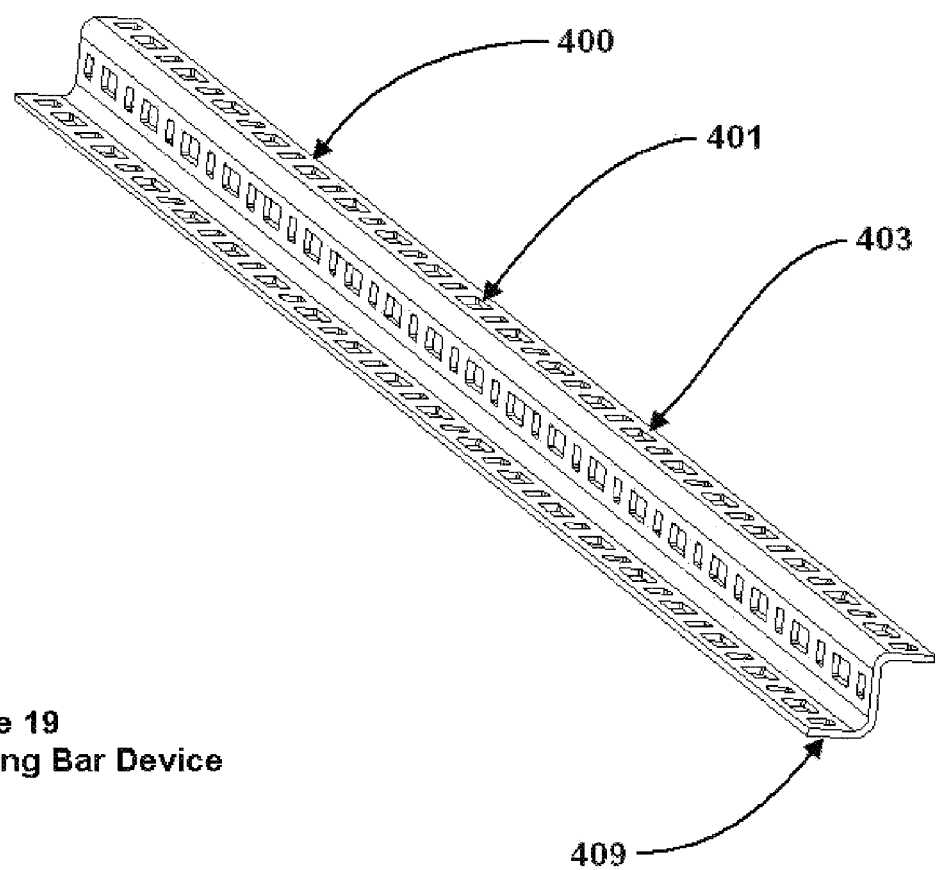
FIG. 19—An embodiment of the present invention, a clipping bar device.

FIG. 19 shows an embodiment of the present invention, a clipping bar device 400 having holes 401. The holes 401 in the clipping bar device 400 shown in FIG. 19 are square holes 403, and the clipping bar device 400 has a "Z-shaped" cross-section 409.

Figure 20:
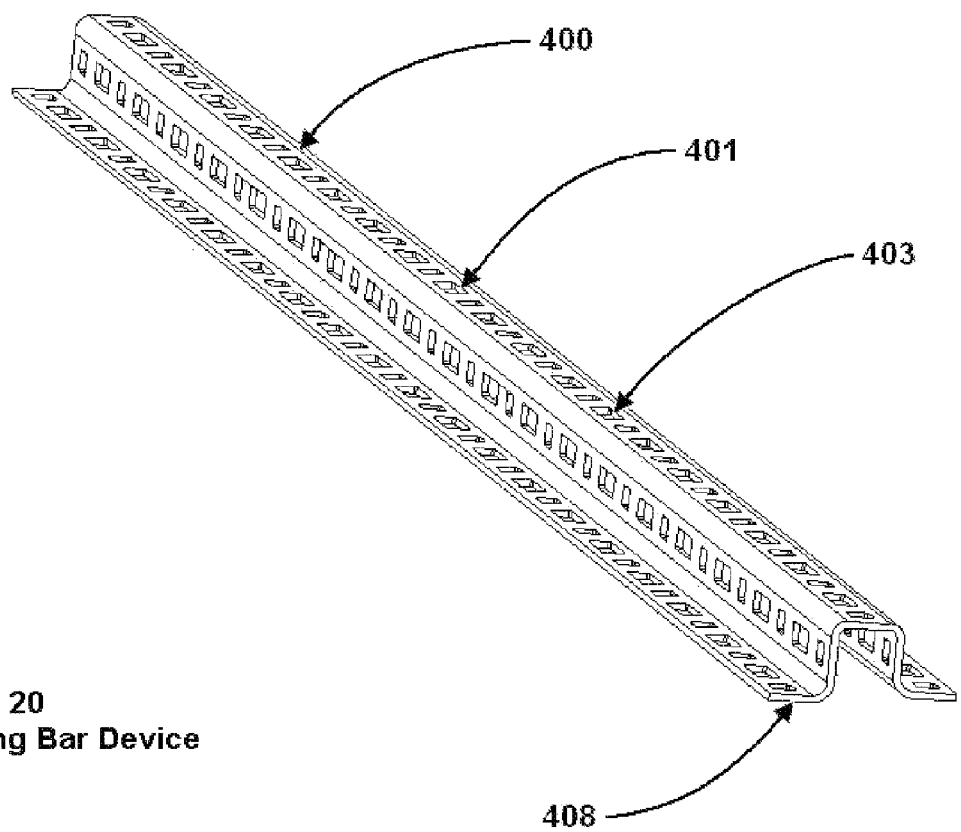
FIG. 20—An embodiment of the present invention, a clipping bar device.

FIG. 20 shows an embodiment of the present invention, a clipping bar device 400 having holes 401. The holes 401 in the clipping bar device 400 shown in FIG. 20 are square holes 403, and the clipping bar device 400 has a "hat-section" cross-section 408.

Figure 21:
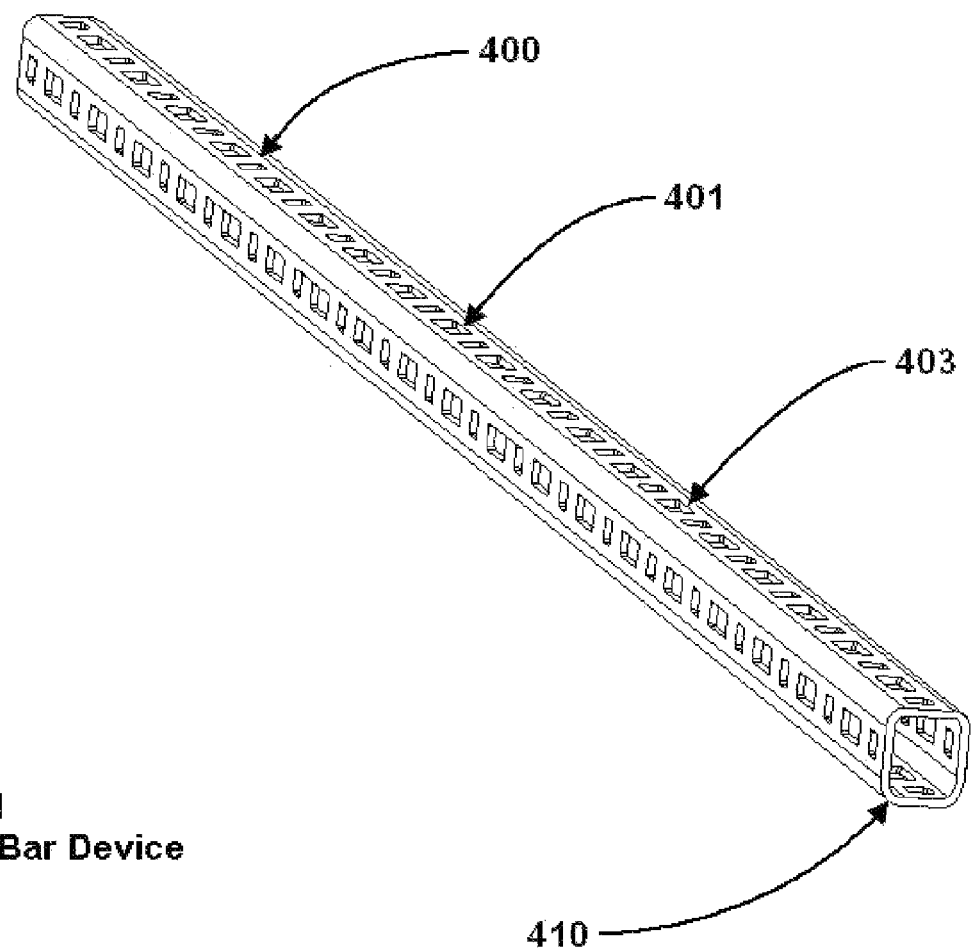
FIG. 21—An embodiment of the present invention, a clipping bar device.

FIG. 21 shows an embodiment of the present invention, a clipping bar device 400 having holes 401. The holes 401 in the clipping bar device 400 shown in FIG. 21 are square holes 403, and the clipping bar device 400 has a tubular cross-section 410.

While specific embodiments have been described in detail in the foregoing detailed description and illustrated in the accompanying drawings, those with ordinary skill in the art will appreciate that various permutations of the invention are possible without departing from the teachings disclosed herein. Accordingly, the particular arrangements disclosed are meant to be illustrative only and not limiting as to the scope of the invention, which is to be given the full breadth of the appended claims and any and all equivalents thereof. Other advantages to a vehicle equipped with an Electrical Harness Clipping Bar for Aftertreatment Device may also be inherent in the invention, without having been described above.

I claim:

1. A vehicle for operation on the ground, comprising:
   a frame, an engine, and an exhaust system;
   an exhaust aftertreatment device mounting assembly connected to said frame;
   an exhaust aftertreatment device supported by said exhaust aftertreatment device mounting assembly and connected to said exhaust system; and
   a clipping bar device connected to said exhaust aftertreatment device, wherein said clipping bar device is provided with a series of holes, said clipping bar device providing support for at least one line, said at least one line being affixed to said clipping bar device by at least one conventional fastener, said conventional fastener attaching to said clipping bar device through at least one of said series of holes.

2. The vehicle for operation on the ground of claim 1, wherein:
   said exhaust aftertreatment device further comprises a particulate filter.

3. The vehicle for operation on the ground of claim 1, wherein:
   said exhaust aftertreatment device further comprises a catalytic converter.

4. The vehicle for operation on the ground of claim 1, wherein:
   said exhaust aftertreatment device being supported by said exhaust aftertreatment device mounting assembly in a vertical orientation.

5. The vehicle for operation on the ground of claim 1, further comprising:
   a heat shield supported by said exhaust aftertreatment device mounting assembly, said heat shield and said clipping bar device sharing at least one common mounting point upon said exhaust aftertreatment device mounting assembly.

6. The vehicle for operation on the ground of claim 1, wherein:

said at least one line being connected to at least one attachment upon exhaust aftertreatment device.

7. The vehicle for operation on the ground of claim 1, wherein:

said clipping bar device providing support for at least one small device.

8. The vehicle for operation on the ground of claim 1, wherein:

said clipping bar device being angular in cross-section.

9. The vehicle for operation on the ground of claim 1, wherein:

said clipping bar device being made from stainless steel.

* * * * *